United States Patent [19]

Albert

[11] Patent Number: 4,544,890
[45] Date of Patent: Oct. 1, 1985

[54] FLAT COIL VELOCITY TRANSDUCER

[75] Inventor: Glenn D. Albert, Yukon, Okla.

[73] Assignee: Magnetic Peripherals Inc., Minneapolis, Minn.

[21] Appl. No.: 549,039

[22] Filed: Nov. 7, 1983

[51] Int. Cl.[4] ............................ G01P 3/46; G01P 3/52
[52] U.S. Cl. ..................................... 324/163; 324/173; 336/110
[58] Field of Search ........................ 324/163, 173, 174; 336/110, 129; 73/518, 519

[56] References Cited

U.S. PATENT DOCUMENTS

| | | | |
|---|---|---|---|
| 3,353,131 | 11/1967 | Stubbs et al. | 324/163 X |
| 3,717,835 | 2/1973 | Roadstrum | 336/129 X |
| 3,958,202 | 5/1976 | Sidor | 336/110 |
| 3,958,203 | 5/1976 | Bernin | 336/110 |
| 4,099,164 | 7/1978 | Sidor et al. | 336/110 X |

*Primary Examiner*—Stanley T. Krawczewicz
*Attorney, Agent, or Firm*—Robert M. Angus; Joseph A. Genovese

[57] ABSTRACT

A flat coil velocity transducer includes a thin, flat coil mounted to a member whose velocity is to be measured. The convolutions of the coil are skewed so that regions at opposite ends of the coil contain predominantly upper or lower legs of the convolutions. The coil moves transverse to a magnetic field to induce voltage in the legs of the coil. However, the field induces voltage in one, but not the other, end region so that a resultant voltage is induced in the coil dependent on the strength and direction of the magnetic field, the number and length of the legs in the region, and the direction and velocity of movement.

4 Claims, 5 Drawing Figures

FLAT COIL VELOCITY TRANSDUCER

This invention relates to velocity transducers, and particularly to flat coil velocity transducers for measuring the movement of a member.

It is desirable in certain applications to know the velocity of a member. For example, in magnetic disk drives of the type used in computer applications, it is desirable to know the velocity of the head arm assembly of the disk drive in relationship to the disk so that the instantaneous velocity of the head over the disk can be accurately ascertained. However, as magnetic disk drives become more miniaturized, it is not often possible to incorporate position or velocity sensors on the head arm assembly. Consequently, there is a need for a simple, effective and small sensor for sensing the position and/or velocity of the head arm assembly for disk drives.

It is the object of the present invention to provide a small, effective transducer for measuring the velocity of movement of a member such as the head arm assembly of a disk drive.

Another object of the present invention is to provide a thin, flat coil velocity transducer.

A velocity transducer in accordance with the present invention includes a thin, flat coil. The coil is attached to a member moveable in a plane between the poles of a magnet and is oriented to move in the magnetic field uniformly with the excursion of the member. The coil is wound so that the convolutions are skewed in the plane of movement of the moveable member and one end of the coil comprises predominantly upper legs of convolutions and the other end of the coil comprises predominantly lower legs of convolutions.

One feature of the present invention resides in the fact that the coil is sufficiently thin as to fit between the actuator magnet and the center pole of the existing disk drive, so that it may be attached to the rotary arm in a plane between the magnet and center pole and move uniformly within the magnetic field. Movement of the arm causes movement of the coil, inducing a signal into the coil which may be utilized in the servo loop of the rotary actuator drive.

The above and other features of this invention will be more fully understood from the following detailed description, and the accompanying drawings, in which.

Figure 1:
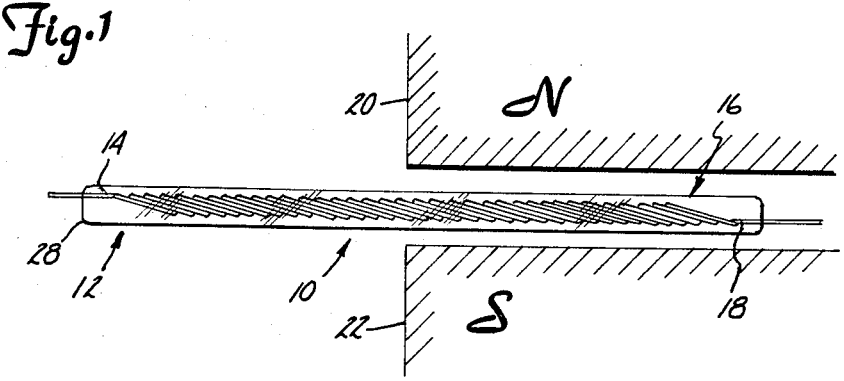
FIG. 1 is a side view of a flat wound velocity transducer positioned within a magnetic field in accordance with the presently preferred embodiment of the present invention.
Figure 2:
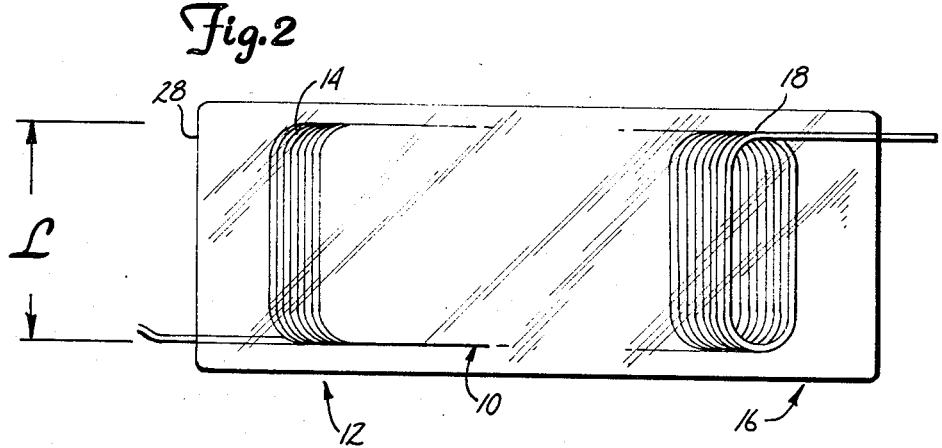
FIG. 2 is a top view of the coil illustrated in FIG. 1.

Referring to the drawings, particularly to FIGS. 1 and 2, there is illustrated a flat coil 10 having a plurality of convolutions or windings. Conveniently, the coil may be manufactured by wrapping a suitable insulated wire, such as enamel-coated copper wire, onto a mandrel to form an air core coil, and then compressing the coil from one edge thereof to bend over or skew the coils into the region of the air core, and into the form of the skewed coils illustrated in FIGS. 1 and 2. The coil may be encapsulated in epoxy material as illustrated at 28. Each convolution of the coil is essentially the same diameter or size, but region 12 at one end of the coil contains predominantly upper legs 14 of the convolutions whereas region 16 at the other end of the coil contains predominantly lower legs 18 of the convolutions.

Figure 4:
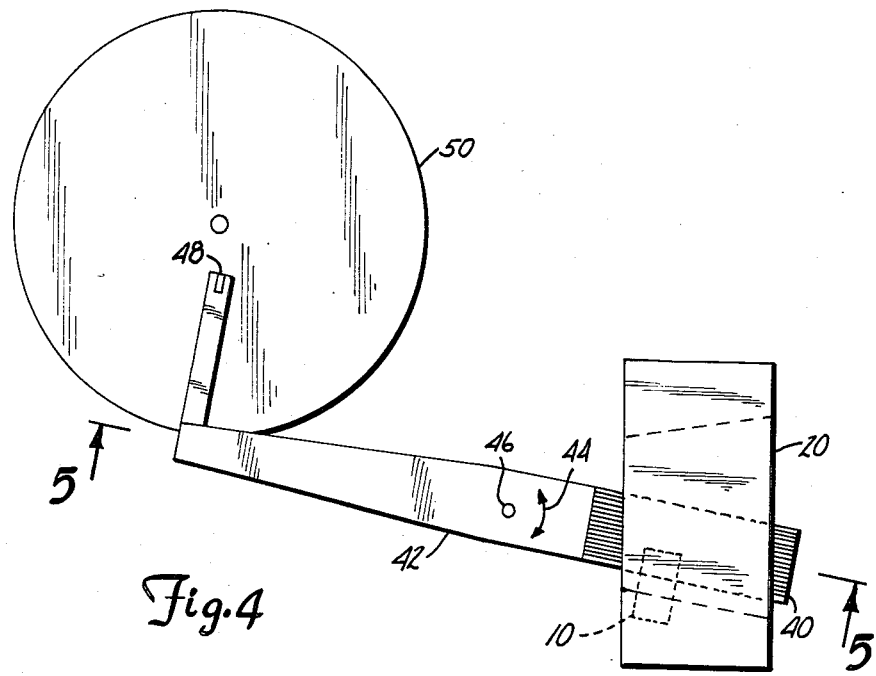
FIGS. 4 and 5 are views of a disk drive having a velocity transducer according to the present invention mounted therein.
Figure 5:
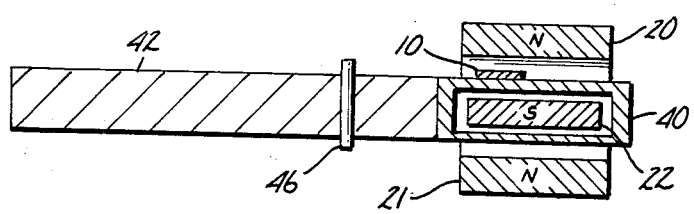

The coil is fastened to a member whose velocity is to be determined, such as actuator coil 40 of the actuator arm 42 of a magnetic disk drive (FIGS. 4 and 5) and is placed in a magnetic field as depicted by the permanent magnets illustrated generally at 20 and 22. For example, magnets 20 and 22 may be the actuator magnet 20, 21 and center pole 22 of a disk drive. In orienting the coil 10, it is important that one region of the coil be free from the effects of the magnetic field, and in this regard, the region 12 is outside of the field formed by magnets 20 and 22, whereas the region 16 is within the field formed by magnets 20 and 22. Hence, as shown particularly in FIG. 3, the legs 18 within the region 16, comprising predominantly lower legs of the convolutions, are within the magnetic field, whereas the legs 14 within region 12, comprising predominantly upper legs of the convolutions, are outside of the magnetic field.

In operation of the velocity transducer, as the member to which the transducer is attached is moved, the coil 10 moves in the magnetic field formed by magnets 20 and 22, thereby inducing a voltage in each leg of the coil within the influence of the magnetic field. The polarity and magnitude of the voltage across the legs within the magnetic field is determined by the direction of the field and direction and velocity of movement of the coil. The magnetic field actually encompasses a locality which includes region 16 and at least a portion of the region 24 shown in FIG. 3, which contains both upper and lower legs. It is important, however, that region 12 be excluded from the effects of the magnetic field. Due to the geometric orientation of the legs, a measurably greater number of lower legs are within the field than are upper legs.

As coil 10 is moved along line 26 transverse to the magnetic field created by magnets 20 and 22, a voltage is induced in each lower leg 18 in region 16 and in each upper and lower legs in region 24 affected by the field. The polarity of the voltage is dependent on the direction of the magnetic field and the direction of movement of the coil. In any case, the voltages induced in the upper legs in region 24 will cancel or offset an equal voltage induced in the lower legs. However, because more lower legs 18 carry an induced voltage than upper legs, a resultant voltage is generated by the coil representative of the velocity and direction of movement of the coil. In particular, it can be shown that the velocity, V, will equal a constant, K, times the voltage induced in the coil, E, divided by the strength of the magnetic field, B, the length of each leg of each winding, L, and the number of legs N of the coil within region 16.

$$V = KE/NBL$$

Since K, B, L and N are constants for a given physical arrangement, the velocity is directly proportional to the induced voltage; measurement of the voltage generated by coil 10 provides a direct measurement of the velocity of movement. Hence, the present invention provides a small, effective velocity transducer capable of measuring the velocity of a member, such as the actuator arm 42 of a magnetic disk drive (FIGS. 4 and 5) as the arm pivots in the direction of arrow 44 about pivot 46 to move head 48 across the surface of disk 50.

Figure 3:
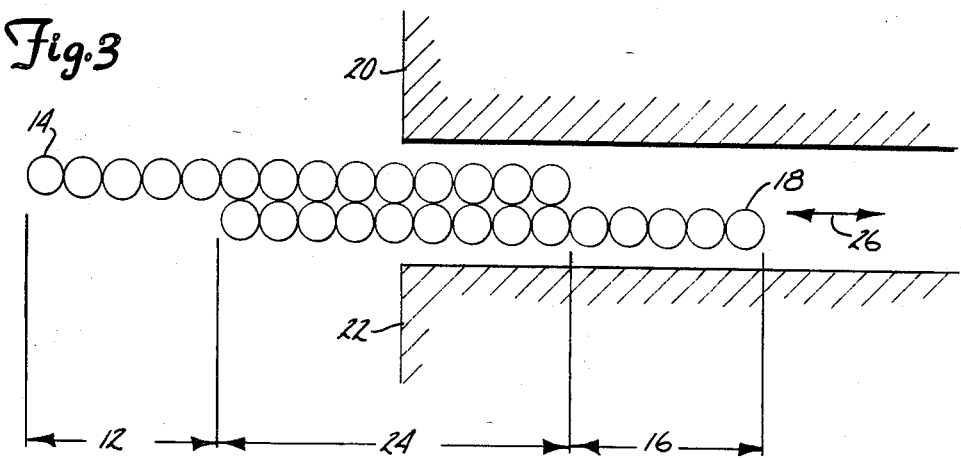
FIG. 3 is a section view of the coil illustrating the principles of operation of the coil as a velocity transducer.

It will be appreciated that ordinary manufacturing tolerances may not permit formation of a skewed coil having regions purely defined as only upper legs, or only lower legs, or equal distribution of upper and lower legs, as shown in FIG. 3. However, even crude manufacturing methods will result in clearly defined pluralities of one type of legs over the other at each end of the coil, and it is only the latter type of characteristics that is necessary for accurate operation of the transducer. Thus, each region (at the ends of the coil) contains predominantly one type of leg or the other. For example, if there are 1000 lower legs in region 16 and that much of region 24 affected by the magnetic field, and if there are 500 upper legs in region 24 affected by the magnetic field, there is a predominance of 500 more lower legs than upper legs in which voltage is induced. If more of the coil moves into the field due to movement of the member to which it is attached, and the number of lower legs increases to 1250 and the upper legs increases to 750 legs, there remains a predominance of 500 more lower legs than upper legs.

Inducement of voltage in upper and lower legs at the fringe area of the magnetic field (where the field is weaker than between the poles) will not adversely affect the accuracy of the transducer if voltage is induced in substantially the same number of upper and lower legs.

This invention is not to be limited by the embodiment shown in the drawings and described in the description, which is given by way of example and not of limitation, but only in accordance with the scope of the appended claims.

What is claimed is:

1. A velocity transducer for measuring the velocity of a moveable member, said transducer comprising
   (a) a substantially thin, flat coil attached to said member having a plurality of convolutions skewed in the plane of movement of the member so that a first region at one end of the coil comprises a plurality of predominantly upper legs of convolutions and a second region at the other end of the coil comprises a plurality of predominantly lower legs of convolutions, and
   (b) means for producing a magnetic field in a direction transverse to said legs in a locality including one of said regions and excluding the other of said regions, the coil being so disposed and arranged with the magnetic field that a voltage is induced in the coil whenever the member is moved causing movement of the coil in a direction transverse to the magnetic field and the legs of the coil.

2. Apparatus according to claim 1 wherein the velocity, V, of movement of said member may be determined from the relationship $$V = KE/NBL$$

where E is the voltage induced in said coil, N is the number of legs within said region in said magnetic field, B is the strength of the magnetic field and L is the length of each leg within said region in said magnetic field.

3. Apparatus according to claim 1 wherein said member is an actuator arm of a disk drive and said means for producing said magnetic field comprises the actuator magnet and center pole of a disk drive.

4. Apparatus according to claim 3 wherein the velocity, V, of movement of said member may be determined from the relationship $$V = KE/NBL$$

where E is the voltage induced in said coil, N is the number of legs within the region in said magnetic field, B is the strength of the magnetic field and L is the length of each leg within said region in said magnetic field.

* * * * *